Oct. 18, 1966  R. C. KOWALSKI  3,279,240
ELASTIC RHEOMETER
Filed Dec. 12, 1963
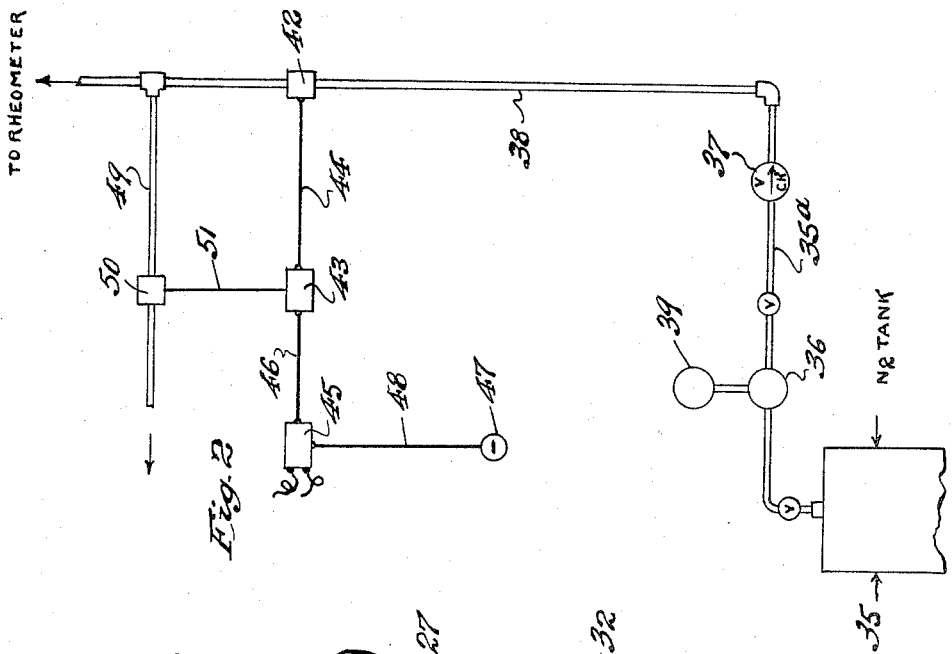
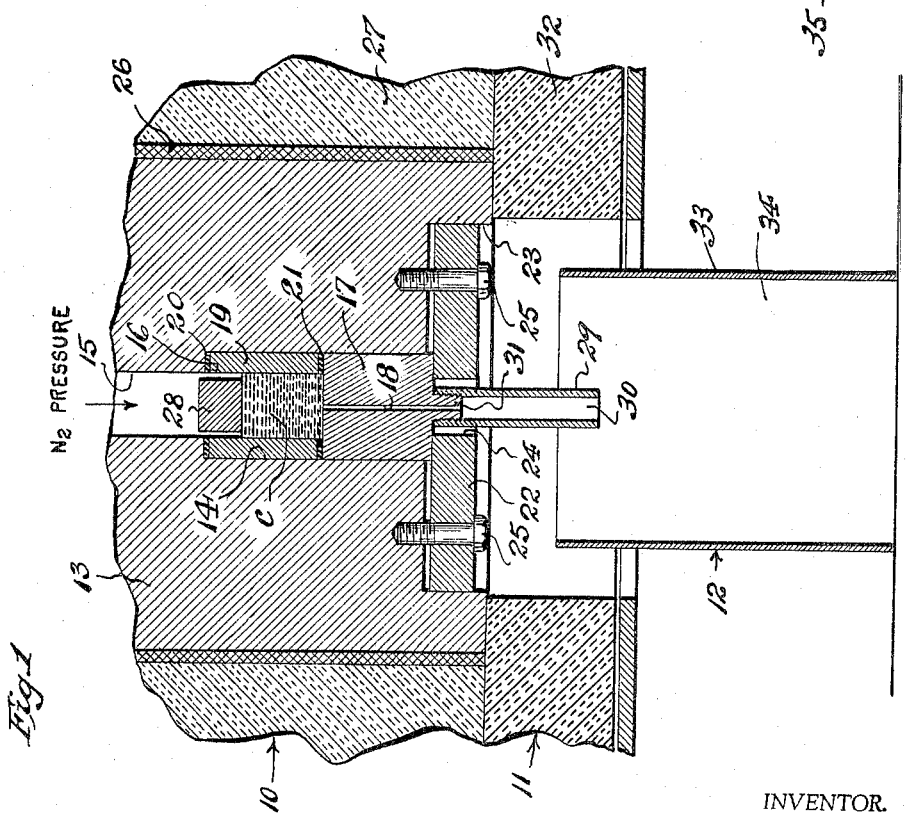
INVENTOR.
Ronald C. Kowalski,
BY
Dudley B. Howard,
Attorney 3,279,240
ELASTIC RHEOMETER
Ronald C. Kowalski, Closter, N.J.
(5008 Homewood Lane, Baytown, Tex.)
Filed Dec. 12, 1963, Ser. No. 330,044
15 Claims. (Cl. 73—15.4)

This invention relates in general to rheometers and has particular reference to instruments in this class intended for use in measuring certain properties of viscoelastic molten materials to include thermoplastic polymeric materials of a wide variety, such as polyethylene, polystyrene, cellulose acetate, ethyl cellulose, and polyvinyl acetate.

Prior to my present invention, rheometers designed to measure properties of viscoelastic molten materials have been capable of measuring precisely only the viscous properties.

It, therefore, is the primary object of my invention to provide a dual-purpose rheometer capable of simultaneous measurement of melt viscosity and recoverable elastic strain when following the successive steps of a closely related process.

To be more explicit, the instrument which I have devised extrudes a charge of selected molten polymeric material through a die having a capillary orifice. The extrudate is in the form of a rod-like specimen, which at first is still in a molten state. Then, after cooling the specimen to room temperature and thus producing solidification, the specimen may be measured for recoverable elastic strain. Before the extrudate is allowed to cool, it is maintained at a temperature somewhat higher than that required for solidification in a "soaking chamber" for a period sufficient to permit "full swell" of the specimen to take place. This is very important, because it is essential to the reliability of the recoverable elastic strain test that the solidified specimen shall have achieved "full swell."

In my improved instrument, each specimen is caused to swell to the full extent determined by: (1) the temperature of the particular material extruded; (2) the applied shear stress; (3) the flow geometry; and (4) the chemical and physical structure of the material. Moreover, the specimen is caused to be cooled from the swollen state to room temperature in such a manner as to prevent distortion of the specimen and to permit room temperature measurement of its diameter, which is directly related to the molten diameter at extrusion temperature through the density differences between the two states.

The utility of this instrument is that it enables the user to impose on any such polymeric material the level of the conditions (1), (2) and (3), above, corresponding to that which exists in commercial processing equipment and to study both the viscous and elastic behavior of the material under these conditions. Also, it permits the user to study a series of such polymeric samples of one type, or of different types, at the same level of conditions, and thus compare the relative values of viscosity and elastic strain of the several samples. Such studies can lead to (a) development of optimum processing conditions and geometry for a given material, (b) development of property specifications to which a particular grade of a polymeric material should be manufactured, (c) manufacturing quality control techniques or (d) definition of resin material evaluation techniques by users of the material.

Still further objects, advantages and features of the invention will become apparent as the following specific description is read in connection with the accompanying drawings, in which:

FIG. 1 is a vertical sectional view, partly broken away, of the elastic rheometer in its presently preferred form; and FIG. 2 is a diagrammatic view of the pressurizing and electrical control system associated with the rheometer.

Referring now in detail to the drawings, FIG. 1 represents the elastic rheometer instrument of my invention. This instrument comprises three principal components, which are arranged coaxially in line with the downward direction of flow of polymeric viscoelastic material undergoing treatment therein, viz: an upstream extrusion element 10, a midstream extrudate expansion element 11, and a downstream cooling and examination element 12.

Extrusion element 10 includes a hollow vertical cylindrical body 13 having a coaxial cylindrical well 14 with a mouth 15 in communication with the upper end thereof. Mouth 15 is connected in suitable manner with a source of supply of measured charges of polymeric material (not shown) and is of smaller diameter than well 14 in order to afford a downwardly facing shoulder 16 for a purpose to be explained later herein.

A cylindrical die 17 having an axial capillary orifice 18 is fitted in the bottom portion of well 14 and a tubular spacer member 19 is mounted in said well above die 17 in coaxial relation thereto to define a cylindrical reservoir for reception of a charge C of selected molten polymeric material delivered from above through mouth 15.

In accordance with the invention, it is necessary to adjust the capacity of the reservoir and die orifice to meet the expansion properties of the several polymeric materials which may be subjected to tests in my rheometer. This may be accomplished by varying the inside diameters of spacer member 19 and die orifice 18 proportionately.

Research work with the present invention has shown that the diameter of the reservoir from which the molten charge is forced into the die inhibits the development of the full extrudate expansion for diameters smaller than a critical size. The critical diameter is dependent on the elastic properties of the molten material and on the level of shear stress being used, increasing with both of these variables. For a highly elastic sample of polypropylene, for example, it was found that at 450° F., no significant inhibition of the extrudate expansion occurred up to about 1000 (1/sec.) shear rate if the reservoir diameter was not smaller than 0.875". Therefore, the invention incorporates an expandable reservoir which may be increased to at least 1.4" for more extreme sets of conditions. In order to provide the best possible thermal control, it is advisable to use the smallest reservoir diameter which creates no inhibition under the conditions of the experiment. Expandability is accomplished by selective use of interchangeable spacer members and dies of different internal diameters.

Variations in the capacity of the reservoir may also be accomplished by changing the length of spacer member 19 and die 17. In this instance, it is essential that, for any combination of spacer and die lengths, the total length of both must always be the same.

To prevent leakage of molten polymeric material and pressurizing gas in bypassing relation to the interior of spacer member 19 and die 17, an upper sealing gasket 20 is interposed between the top edge of said spacer member and shoulder 16, and a lower sealing gasket 21 is similarly interposed between the bottom edge of said spacer member and the upper face of die 17.

An annular locking plate 22 is fitted into a chamfered recess 23 formed in the lower end of body 13 surrounding the bottom of well 14. The central through opening 24 in locking plate 22 is smaller in diameter than die 17 in order that said die may rest upon said plate. Plural vertically adjustable clamping bolts 25, which pierce locking plate 22, are screwed into body 13 and serve as means to sustain said plate beneath said body and to exert sealing compression upon gaskets 20 and 21.

Body 13 is surrounded by a vertically coextensive band heater 26 and said heater is in its turn circumferentially enclosed by a cylindrical wall 27 of suitable insulating material to direct the heat emanating from the heater radially inward through said body to well 14 and the molten polymeric material passing through the reservoir constituted by spacer member 19 and through capillary orifice 18 of die 17.

In order to prevent channeling of pressurizing gas through the charge C of polymeric material in the reservoir constituted by spacer member 19, a follower 28 of material which will float in said charge is mounted in said reservoir.

Midstream element 11 of the rheometer includes a vertically extending elasticity tube 29, preferably made of aluminum, that forms the lateral wall of a cylindrical soaking chamber 30 and is suspended from upstream element 10 by screw-threaded engagement with a central nipple 31 which projects downwardly from the lower end of die 17 into opening 24 in locking plate 22.

Research work done with the present invention has shown that the expansion of the extrudate on leaving die 17 occurs over a finite period of time, which may be on the order of ten seconds. This time interval varies with the properties of the material, but is usually of such magnitude that rapid cooling or quenching of the specimen must be avoided. This is the reason for employment of soaking chamber 30, which is heated by conduction and convection from body 13 of the instrument. The exact dimensions of soaking chamber 30 (in which the extrudate is permitted to expand before being cooled to room temperature) and its temperature are governed by the properties of the material being studied. For convenience in operation, it is desirable to make soaking chamber 30 as short in length and as wide in diameter as the material will permit without inhibiting the achievement of its full expansion. A heat conserving wall 32 of insulating material surrounds elasticity tube 29 and soaking chamber 30 contained therein.

Downstream element 12 of the rheometer includes a box-like structure 33 that encloses a cooling chamber 34, the function of which is to cool the extrudate specimen from the warm temperature obtaining in soaking chamber 30 to room temperature and thereby cause it to solidify but without being subjected to distortion, such as could be caused by disturbing influences. For instance, air convection currents at the level normally present in a closed room can cause the specimen to bend into an arc while cooling, thus creating a specimen with an elliptical cross-section instead of the perfectly circular cross-section desired for accurate expansion measurements.

It being necessary to conduct visual examination of the behavior of the extrudate specimen during the cooling step of my process in chamber 34, a system of mirrors (not shown) may be introduced into box-like structure 33, or the latter may be made of transparent material, such as glass. It is intended that structure 33 shall be rested movably upon some suitable support, such as a workbench or table, instead of being rigidly connected to body 13 of upstream element 10. Moreover, to permit access to cooling chamber 34 by manually operated tongs (not shown) for handling the extrudate specimen, structure 33 may be composed of separable wall sections (not shown) which can be opened or closed at will.

Cooling of the extruded specimen in chamber 34 is preferred to cooling by immersion in liquids, because such immersion introduces problems in addition to distortions similar to those caused by air currents. The liquid density must be lower than that of the molten polymer; otherwise the extrudate would curl upwardly. Such liquids are usually reactive with, or mutually soluble in, some fractions of the molten polymer.

FIG. 2 discloses a simplified form of the pressurizing system which supplies the instrument with appropriately controlled levels of pressure of an inert gas, such as nitrogen ($N_2$). In this system, the gas is stored in a pressurized tank 35 that is connected by suitable piping 35a through a pressure regulator 36 and a check valve 37 to a gas supply pipe line 38 leading to mouth 15 of rheometer well 14. Pressure regulator 36 has a gas pressure gauge 39 by which the pressure in the supply pipe line may be read at any time.

A solenoid control valve 42 is provided in gas supply pipe line 38 between check valve 37 and the rheometer to control flow of inert gas to the latter from tank 35. The solenoid of control valve 42 is electrically connected to a relay 43 by conductor means 44. A clock-type timer 45 is electrically connected to relay 43 by conductor means 46. A hand switch 47, located in close proximity to the rheometer for use by its operator, is connected electrically by conductor means 48 to timer 45 in such a manner that said timer may be started and stopped by manipulation of said switch. However, it is within the scope of the present invention to supplement clock-type timer with an automatic timer (not shown) for use during any intervals when the rheometer is unattended.

Gas supply pipe line 38 is connected at a point between control valve 42 and the rheometer to an atmospheric vent pipe line 49 controlled by a solenoid exhaust valve 50.

Relay 43 is also electrically connected by conductor means 51 to the solenoid of exhaust valve 50 in such a manner that said relay will close said exhaust valve at the same time that hand switch 47 starts timer 45 and energizes relay 43 in a manner to open control valve 42. Conversely, when hand switch 47 is manipulated to stop timer 45, relay 43 will be caused to close control valve 42 and open exhaust valve 50 simultaneously, thereby terminating exertion of gas pressure on the reservoir constituted by spacer member 19 and opening gas supply pipe line 38 to the atmosphere.

An analysis of the operation of the present system has resulted in the conclusion that there are two important reasons why a system must be employed which is capable of increasing the pressure on the molten polymer charge from atmospheric pressure to the desired extrusion level in a very short period of time. First, the molten polymer extrudate, while it is in the soaking and cooling chambers, will tend to "neck down" or elongate due to the influence of gravity. This occurs, at any point on the specimen, only to an extent determined by the weight of the portion thereof below that point. Consequently, the diameter measurement should be made near the lower, or leading, end of the specimen where the shear stress due to gravity produces an insignificant shear rate. Therefore, it is important that, at the beginning of a run, the desired pressure level be achieved quickly, before a significant amount of material is extruded. Second, it is an intention of the invention to utilize the same specimen for a viscous, as well as an elastic, measurement. Therefore, the specimen is to be extruded for a precisely measured time interval and subsequently weighed, from which data a flow rate is calculated. If the flow rate is to be constant over the time interval, the rates of pressurizing and depressurizing must be very rapid. Rapid rates are achieved in the present invention by designing the system for both minimum pressure drop and minimum capacity. This is accomplished by employing only the minimum number of fittings and pipe bends, as shown in FIG. 2, and by using the shortest possible lengths of piping to connect the fittings, as determined by the space requirements of the fittings. Two tests are used to measure the effectiveness of the system. The first is to observe the behavior of pressure gauge 39 (FIG. 2) when the gas control valve 42 is opened. If the gauge pointer is deflected downward to a minimum point no lower than 90% of the final equilibrated value, then, it has been found that both of the first and second requirements stated above are satisfied. Further verification can be made by repeating viscous flow measurements at successively shorter time intervals, but at the same pressure, until the flow rates begin to decrease significantly from a constant value. If this occurs at a time interval shorter than 1.4 seconds, the system is behaving in accordance with the stated requirements.

Certain of what are regarded as the more important contributions effected by various features of the present invention may be classified under four headings, viz: (1) provision for the achievement by the molten extrudate of its full, undistorted expansion after leaving the capillary die orifice; (2) provision for the cooling and solidification of the extrudate in an environment which is free of any external influences which could distort the extrudate; (3) provision of a reservoir environment that does not impose any prior limitation on the level of expansion which may be achieved by a subsequent experiment; and (4) provision of a system which yields, from each specimen extruded, a piece of precise viscous flow data and a piece of precise elastic expansion data (due to rapid pressurization). Moreover, the instrument which I have devised enables one to determine how far a particular plastic material may be subjected to deformation by application of heat and pressure without destroying its molecular structure.

Operation

After making any preliminary tests to determine the operational condition of the pressure-control system, as suggested earlier herein, a charge C of the desired quantity of selected polymeric material is admitted to the reservoir in well 14 of the rheometer through mouth 15, and the cycle of operational steps is commenced by closing hand switch 47 to start timer 45 and actuate relay 43 in a manner to open gas control valve 42 and simultaneously close exhaust valve 50. Thereafter, at the appropriate time indicated by timer 45, hand switch is opened to stop said timer and deactivate relay 43, which closes gas control valve 42 and opens exhaust valve 50 to allow gas pressure to escape from the rheometer reservoir.

While the invention has been illustrated and described with respect to a particular embodiment thereof, it will be understood that it is intended to cover all changes and modifications of the embodiment shown which do not constitute departures from the spirit of the invention and scope of the appended claims.

I claim:
1. An elastic rheometer for measuring simultaneously the viscous and elastic properties of molten polymeric viscoelastic materials over broad ranges of temperature, shear stress and die geometry comprising:
   an upstream extrusion element including:
      a hollow vertical cylindrical body of heat conducting material having a coaxial cylindrical well;
      a cylindrical die fitting the bottom portion of said well and having an axial capillary orifice;
      means defining a cylindrical reservoir for reception of a charge of molten polymeric material surmounting said die in said well;
      means to apply downward extrusion pressure to the top of said reservoir; and
      means to heat said body and maintain the viscoelastic material above its melting point;
   a midstream extrudate expansion element including a tubular soaking chamber in vertical alignment and communication with the lower end of the die orifice, said soaking chamber arranged to maintain the extruded viscoelastic material at or above its solidification temperature, said chamber being of sufficiently larger diameter than said die orifice to permit free expansion of the extrudate therein while achieving full swell; and
   a downstream cooling and examination element including a convection-free chamber in communication with the lower end of said soaking chamber.

2. The invention defined in claim 1, wherein the heating means for the body is a band heater circumferentially enclosing said body in substantially coextensive relation thereto.

3. The invention defined in claim 2, with the addition of a hollow cylindrical wall of heat insulation material circumferentially enclosing the band heater.

4. The invention defined in claim 1, wherein the reservoir defining means of the upstream extrusion element is constituted by a tubular spacer member of heat conducting material having a cylindrical inner peripheral wall.

5. The invention defined in claim 4, wherein spacer members of varying inside diameters and dies having capillary orifices of varying diameters to suit polymeric materials of different properties are provided for selective interchangeable combination in the well of the instrument body.

6. The invention defined in claim 1, wherein the reservoir defining means of the upstream extrusion element is constituted by a tubular spacer member of heat conducting material having a cylindrical inner peripheral wall; wherein spacer members and dies of varying lengths to suit polymeric materials of different properties are provided for selective interchangeable combination in the well of the instrument body; and wherein the total length of spacer member and die combined at any time equals the total length of any other combination thereof.

7. The invention defined in claim 1, wherein the body of the extrusion element has a mouth in communication with the top of the well for introduction of a pressurized gas; and a follower disk of suitable material floating upon the charge of plastic material in the reservoir to prevent channeling of the gas.

8. The invention defined in claim 1, wherein the body of the extrusion element has a mouth in communication with the top of the well of smaller diameter than said well to provide a downwardly facing shoulder opposed to the upper edge of the tubular spacer member; wherein respective upper and lower sealing gaskets intervene between the upper and lower edges of said spacer member and said shoulder and the die; and with the addition of adjustable means to press the die upwardly toward the tubular spacer member for sealing compression of said sealing gaskets.

9. The invention defined in claim 8, wherein the die pressing means comprises:
   a horizontal locking plate underlying the lower end of the body of the extrusion element and the well and having a through opening smaller in diameter than the die to receive the soaking chamber of the midstream extrudate expansion element; and
      bolt means connecting said locking plate to said body.

10. The process of producing test specimens of viscoelastic molten polymeric materials, which specimens, by virtue of their size and weight, may be used, together with the dimensions of the die and reservoir and densities of the molten and solid material and time interval of the experiment, to calculate, from each specimen, both the apparent melt viscosity and the recoverable elastic strain for any such material, at the condition of extrusion, which process consists in:
   melting a charge of polymeric material in a reservoir,
   extruding a rod-like specimen of the charge from the reservoir through a capillary orifice in a die, and
   maintaining the temperature of the extruded specimen sufficiently high to sustain the material in a fluid state and allow full swelling thereof.

11. The invention of claim 10, including the additional step of:
   cooling the swollen specimen in a convection-free environment to a temperature sufficiently low to cause solidification of the extruded swollen specimen, thereby avoiding distortion.

12. The invention of claim 10, including the step of:
   measuring the time interval during which the specimen is extruded.

13. The invention of claim 10, including the step of:

maintaining the dimensions of the reservoir as compared to the orifice sufficiently large that further increase thereof produces no further increase in the extruded specimen diameter, thereby averting extrudate expansion inhibition.

14. The method of producing test specimens of viscoelastic polymeric material which consists in:

charging a heated vertical cylindrical reservoir with molten polymeric material;

exerting downward pressure on the top surface of the reservoir at a rapid rate to extrude a rod-like specimen through a capillary vertical orifice in the die;

holding the specimen in a vertical soaking chamber located directly beneath the die in alignment with the capillary orifice thereof and maintaining the temperature of the specimen sufficiently high to sustain the specimen in a fluid state, thereby allowing it to swell; and then lowering the specimen into a room temperature cooling chamber free from excessive convection currents and sustaining the specimen in the cooling chamber for a time period sufficient to solidify the same.

15. The invention defined in claim 1, with the addition of:

a tank containing a pressurized inert gas;

a gas supply line connecting said tank with the upper end of the reservoir in the body of the rheometer;

pressure regulator means provided in said gas supply line;

a solenoid control valve for said gas supply line located between said pressure regulator and said rheometer reservoir;

a timer;

a hand switch to actuate said timer;

a relay interconnected with said timer and gas control valve and being actuated by said hand switch in a manner to open said valve when the timer is started;

an atmospheric vent pipe line connected to said gas supply pipe line at a point between said solenoid control valve and the rheometer;

a solenoid exhaust valve in said atmospheric vent pipe line; and electrical conductor means connecting said relay with the solenoid of the exhaust valve in such a manner that said relay will open said exhaust valve when said gas control valve is closed and will close said exhaust valve when said gas control valve is opened.

References Cited by the Examiner

UNITED STATES PATENTS

| | | | |
|---|---|---|---|
| 2,112,190 | 3/1938 | Dillon et al. | 73—15.4 X |
| 3,167,950 | 2/1965 | Gamlen | 73—56 |

FOREIGN PATENTS

| | | |
|---|---|---|
| 1,222,688 | 1/1960 | France. |

RICHARD C. QUEISSER, *Primary Examiner.*

J. C. GOLDSTEIN, *Assistant Examiner.*